United States Patent [19]

Elias et al.

[11] 4,410,293
[45] Oct. 18, 1983

[54] MECHANICAL PRELOAD NUT ASSEMBLY

[75] Inventors: Jack D. Elias, Torrance; John B. Cardoso, San Pedro, both of Calif.

[73] Assignee: The United States of America as represented by the Secretary of the Air Force, Washington, D.C.

[21] Appl. No.: 293,780

[22] Filed: Aug. 18, 1981

[51] Int. Cl.³ .............................................. F16B 37/10
[52] U.S. Cl. ...................................... 403/24; 411/433
[58] Field of Search .................. 403/11, 12, 21, 2, 24; 411/432, 433, 434

[56] References Cited

U.S. PATENT DOCUMENTS

| | | | |
|---|---|---|---|
| 2,653,504 | 9/1953 | Smith | 85/1 |
| 3,431,854 | 3/1969 | Rabenhorst | 102/49.4 |
| 3,695,139 | 10/1972 | Howe | 411/432 |
| 3,797,336 | 3/1974 | Howe | 411/434 |
| 3,863,570 | 2/1975 | Bixby | 102/49.4 |
| 3,910,154 | 10/1975 | Gardner | 85/33 |
| 4,082,468 | 4/1978 | Von Base | 403/2 |

Primary Examiner—Andrew V. Kundrat
Attorney, Agent, or Firm—Donald J. Singer; John R. Flanagan

[57] ABSTRACT

An assembly for attaching a re-entry vehicle to its booster with a high preload force includes a split nut and a split band for encompassing the nut and retaining it in a collapsed condition in which it forces the booster against the re-entry vehicle at the desired preload level. The split band is held in an assembled condition about the nut by a plurality of separation bolts and a plurality of yieldable belleville washer and bolt assemblies. Actuating the separation bolts allows the band to move to a disassembled condition and the split nut to an expanded condition. However, the rate of their movements is controlled by the spring rate of the belleville washers whereby the preload is released in a gradual manner.

6 Claims, 3 Drawing Figures

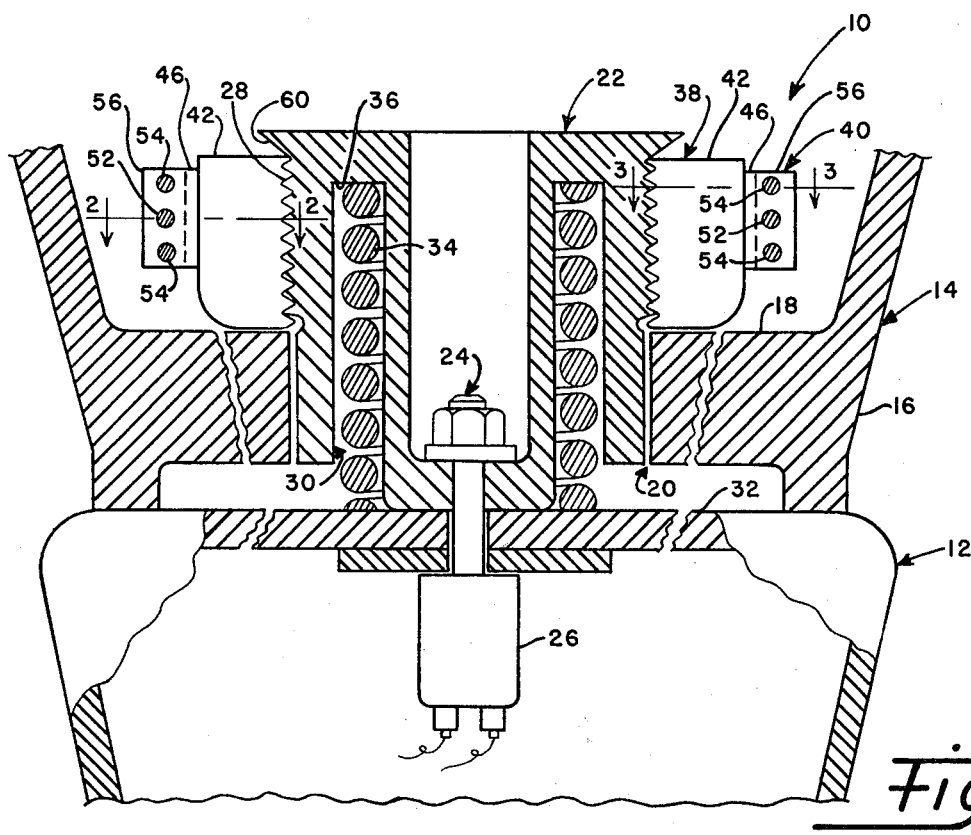
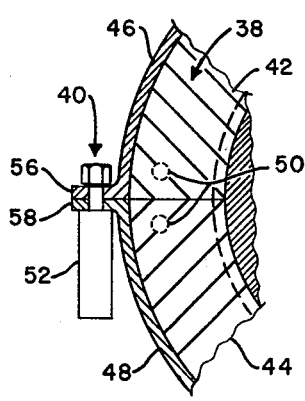
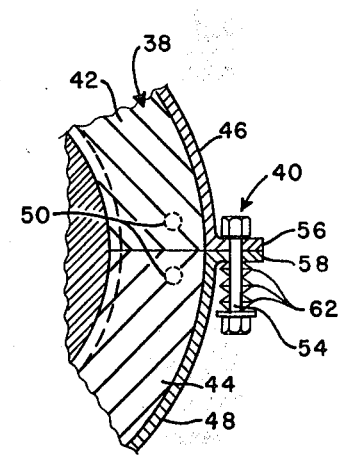

MECHANICAL PRELOAD NUT ASSEMBLY

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The present invention broadly relates to space vehicle separation systems and, more particularly is concerned with an assembly for mechanically attaching a re-entry vehicle to a booster with a high preload level of force which is releasable in a smooth, gradual manner.

2. Description of the Prior Art

Many re-entry vehicles must be attached to their boosters with a high preload level of force. The high preload level is required for these vehicles in order to maintain a stiffness level between the vehicle and its booster sufficient to avoid production of dangerous levels of vibration therein as the vehicle or missile assembly is subjected to shock and vibration during launch and flight. The patents to Smith, U.S. Pat. No. 2,653,504; Rabenhorst, U.S. Pat. No. 3,431,854; Bixby, U.S. Pat. No. 3,863,570; and Gardner U.S. Pat. No. 3,910,154, relate to various assemblies for rigidly connecting components, such as separate missile stages and the like, together and then utilizing either explosive force and/or hydraulic pressure for actuating separation of the connected components.

In many cases, however, it is necessary to release the preload force on the connected components in a gradual manner before separating them so that the preload force itself will not deliver an unacceptably high shock load to the components. Various devices have been used to accomplish this task, including hydraulically-operated nuts which release the preload force in increments. However, hydraulically-powered mechanisms tend to be complicated and adversely affected by environmental conditions such as variations in temperature. Therefore, a need exists for a mechanism which facilitates controlled release of high preload force levels on components so as to avoid deleterious shocks and vibrations therein while, at the same time, operating reliably and uniformly over the normal temperature range encountered by such components.

SUMMARY OF THE INVENTION

The present invention provides a mechanical preload assembly intended to satisfy the aforementioned needs. Since it is entirely mechanical, it is largely insensitive to variations in temperature which are experienced by components, such as re-entry vehicles or the like. Furthermore, it can be easily sized for different load levels and action time requirements for releasing the preload.

Accordingly, the present invention is directed to an assembly for attaching components together, such as a re-entry vehicle and a booster, with a high preload level of force. The attaching assembly is comprised by: (a) a frame member attached to the booster and disposing the booster on the re-entry vehicle; (b) a separation housing disposed adjacent the frame member and connected to the re-entry vehicle; (c) a split nut disposable in a collapsed condition for connecting the separation housing to the frame member and thereby retaining the booster on the re-entry vehicle at the high preload level of force, with the split nut being movable to an expanded condition for releasing the preload level of force; and (d) a split band for encompassing the split nut and retaining it in its collapsed condition when the band is disposed in an assembled condition about the nut, and for releasing retention of the nut and allowing it to move toward its expanded condition and provide gradual release of the preload level of force of the booster on the reentry vehicle when the band is actuated to a disassembled condition about the nut.

More particularly, the split band includes a plurality of sections disposable end to end for forming a band to encompass the split nut. Also the band includes a first plurality of elements, such as separation bolts, which connect the sections together end to end when the band is disposed in the assembled condition, and which disconnect the sections from one another when the band is actuated to the disassembled condition. Finally, the band includes a second plurality of elements, such as belleville washer and bolt assemblies, which connect the sections together end to end, but are operative to allow release of the sections from one another at a controlled rate when the band is actuated to the disassembled condition.

BRIEF DESCRIPTION OF THE DRAWINGS

FIG. 1 is an elevational view, partly in section, of a mechanical preload nut assembly embodying the principles of the present invention.

FIG. 2 is a fragmentary view, partly in section, of the split nut and split band of the assembly as seen along line 2—2 of FIG. 1.

FIG. 3 is another fragmentary view, partly in section, of the split nut and split band of the assembly as seen along line 3—3 of FIG. 1.

DETAILED DESCRIPTION OF THE INVENTION

Referring now to the drawings, and more particularly to FIG. 1, there is shown the preferred embodiment of the mechanical preload nut assembly of the present invention, being generally designated 10. The purpose for the assembly 10 is to attach components together, such as a re-entry vehicle 12 and a booster 14, with a high preload level of force.

The booster 14 has attached thereto a frame member 16 which disposes the booster 14 on the re-entry vehicle 12. The frame member 16 has a web portion 18 which defines a central opening 20. A cylindrically-shaped separation housing 22 is disposed in and extends through the central opening 20 of the frame member 16, and is connected to the re-entry vehicle 12 by a separation bolt assembly 24. The bolt assembly 24 is strong enough to accommodate the preload force and any other forces encountered in flight. By pyrotechnic or other suitable means a nut 26 of the bolt assembly 24 can be actuated to separate therefrom and thereby disconnect the housing 22 from the re-entry vehicle 12. The separation housing 22 also has an externally threaded periphery 28 which extends beyond the web portion 18 of the frame member 16, the purpose for which will become apparent hereinafter. Finally, the housing 22 has an internal annular slot 30 defined therein which opens toward a top surface 32 of the re-entry vehicle 12 on which the frame member 16 of the booster 14 rests. A spring 34 is contained in a compressed state within the slot 30 between an inner surface 36 defining the end of the slot and the top surface 32 of the re-entry vehicle 12. When the bolt assembly 24 is actuated to disconnect the housing 22 from the re-entry vehicle 12, the compressed spring 34 imparts a predetermined velocity of separation of the re-entry vehicle 12 relative to the housing 22. The spring 34 is attached or tethered to the housing 22 by suitable means (not shown) so as to avoid being ejected into space separated from the housing.

The parts of the assembly 10 for attaching the booster 14 on the re-entry vehicle 12 at the desired high preload level of force include the above-mentioned web portion 18 of the frame member 16 and the threaded periphery 28 of the separation housing 22, and, in addition thereto, a split nut 38 and a split band 40. The split nut 38 is comprised by a pair of nut segments 42, 44 (FIGS. 2 and 3) in the preferred embodiment, although it could be formed by more than two segments. Similarly, the split band 40 is comprised by a pair of band sections 46, 48 (FIGS. 2 and 3) disposed end to end, although, like the split nut, it could also be formed by more than two sections.

The split nut 38 is disposable in a collapsed condition, such as seen in FIGS. 1–3, in which it connects the separation housing 22 to the frame member 16 and thereby retains the booster 14 on the re-entry vehicle 12 at the aforementioned high preload level of force. The split band 49 encompasses the split nut 38 and retains the nut in its collapsed condition when the band 40 is disposed in an assembled condition about the nut, such as is also seen in FIGS. 1–3.

The split nut segments 42, 44 are internally threaded so as to be engageable with the externally threaded periphery 28 of the separation housing 22 when the split nut 38 is disposed in its collapsed condition. When the split nut 38 is applied to the housing 22, it overlies and is engageable with the web portion 18 of the frame member 16. The nut 38 may be tightened down against the web portion 18 so as to force the booster 14 against the reentry vehicle 12 at the desired preload force level. The split nut 38 with split band 40 thereabout may be tightened or torqued to the desired preload level by any suitable tool when assembled about the housing periphery 28. Holes may be formed in the split nut 38 at the locations of dashed circles 50 in FIGS. 2 and 3 for providing means for applying a suitable tool to the nut 38 for that purpose.

The split band 40 is also comprised by first and second pluralities of elements, such as separation bolts 52 and yieldable belleville washer and bolt assemblies 54, respectively. The first plurality of elements, or bolts 52, are two in number in the preferred embodiment. More than two would be used in the case where the band is comprised of more than two sections. The bolts 52 connect the sections 46, 48 together at their corresponding opposite end flanges 56, 58. The second plurality of elements, or yieldable assemblies 54, are four in number in the preferred embodiment, or a pair at each of the corresponding ends of the band sections. More than four would be used in the case where the band is comprised of more than two sections. The yieldable assemblies 54 in each pair thereof connect the band sections 46, 48 together at their corresponding opposite end flanges 56, 58 on either side of one of the separation bolts 52.

Adjacent a side of the split nut 38 opposite from the frame member web portion 18, the separation housing 22 has a radially outward projecting circumferential release ramp 60 upon which the split nut segments 42, 44 will slide outwardly away from one another when the split nut 38 moves from its collapsed condition to an expanded condition (not shown), as the split band 40 is actuated to move from its assembled condition to a disassembled condition (not shown). The ramp 60 has the same inclination angle as the nut and housing threads.

When it is desired to release the preload of the booster 14 on the re-entry vehicle 12 and thereafter detach the re-entry vehicle from the booster at the proper time in the flight trajectory, the separation bolts 52, being preferably of the pyrotechnic type, are fired first. (The bolts can be the self-contained type.) The bolts 52 then immediately release or disconnect the band sections 46, 48 from one another, permitting them to move outward toward their disassembled condition. Consequently, the nut segments 42, 44 are also permitted to move outwardly away from one another toward their expanded condition. However, the rate of this outward movement and the maximum distance thereof are controlled and limited respectfully by the belleville washers 62 of the yieldable assemblies 54. The belleville washers can be sized for the proper spring rate so that the desired action time for release of the preload can be achieved. As the split nut segments 42, 44 move outward, they will also slide up on their threads and on the release ramp 60 of the separation housing 22. This sliding action, together with the spring rate provided by the belleville washers 62, will ensure a smooth, gradual release of the preload.

After the preload is released, either down to zero or to a nominal level (which can be regulated by the belleville washer sizing), the nut 26 on the separation bolt assembly 24 can be actuated, releasing the re-entry vehicle 12 which will then be pushed off or separated from the booster 14 by the velocity spring 34.

It will be apparent that the belleville washers can be replaced with conventional compression coil springs for performing the same function. The action time for release of the preload will be largely controlled by the belleville washers (or springs) and bolt assemblies 54 on the split band 40. These should operate fairly uniformily over the normal temperature range encountered by re-entry vehicles. Also, no major items of hardware are released into space by actuation of the assembly 10. The split nut 38 and split band 40 remain assembled to the separation housing 22 after actuation. The separation bolts 52 on the split band 40 may be tethered thereto to prevent their ejection. Furthermore, the separation bolts 52 include a redundant safety feature, in that the assembly will operate and the preload will be released even if only one of the separation bolts is actuated. Finally, all of the hardware of the assembly, with the exception of the separation bolts (which can be purchased to high-reliability specifications), can be operated and tested repeatedly before flight to make certain that performance parameters and action time will be within the desired values.

It is thought that the mechanical preload nut assembly of the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

Having thus described the invention, what is claimed is:

1. An assembly for attaching components together, such as a re-entry vehicle and a booster, with a high preload level of force, comprising:
   (a) a frame member attached to said booster and disposing said booster on said re-entry vehicle;
   (b) a separation housing disposed adjacent said frame member and connected to said re-entry vehicle;
   (c) a split nut disposable in a collapsed condition for connecting said separation housing to said frame member and thereby retaining said booster on said re-entry vehicle at said high preload level of force, said nut being movable to an expanded condition for releasing said preload level of force; and
   (d) a split band for encompassing said split nut and retaining it in its collapsed condition when said band is disposed in an assembled condition about said nut, and for releasing retention of said split nut and allowing it to move toward its expanded condition and provide gradual release of said preload level of force of said booster on said re-entry vehicle when said band assembly is actuated to a disassembled condition about said nut.

2. An attaching assembly as recited in claim 1, wherein:
   said frame member has a portion defining a central opening;
   said separation housing is disposed within, and extends through, said central opening and has an externally threaded periphery which extends beyond said frame member portion; and
   said split nut is internally threaded so as to engage with said externally threaded periphery of said separation housing and engageably overlie said frame member portion when said split nut is in its collapsed condition.

3. An attaching assembly as recited in claims 1 or 2, wherein said split band includes:
   a plurality of sections disposable end to end for forming a continuous band to encompass said split nut;
   a first plurality of elements connecting said sections together end to end when said band is disposed in said assembled condition, and for disconnecting said sections from one another when said band is actuated to said disassembled condition; and
   a second plurality of elements connecting said sections together end to end, but being operative to allow release of said sections from one another at a controlled rate when said band is actuated to said disassembled condition.

4. An attaching assembly as recited in claim 3 wherein each of said first plurality of elements is a separation bolt and each of said second plurality of elements is a belleville washer and bolt assembly.

5. An attaching assembly as recited in claim 3, wherein said split nut is comprised by a plurality of nut segments which move outwardly away from one another when said split nut moves from said collapsed to expanded condition.

6. An attaching assembly as recited in claim 5, wherein said separation housing has a circumferential release ramp upon which said nut segments slide when said split nut moves from said collapsed to expanded condition whereby said sliding movement of said nut segments together with said controlled release rate of second plurality of elements ensure a smooth, gradual release of said preload level of said force of said booster on said re-entry vehicle.

* * * * *